United States Patent [19]

Katou et al.

[11] Patent Number: 5,270,890
[45] Date of Patent: Dec. 14, 1993

[54] HELICAL SCAN TYPE ROTARY HEAD APPARATUS

[75] Inventors: Daiichirou Katou; Takuji Sekiguchi, both of Tokyo; Toshihiko Okina, Komagane; Tsuneharu Hashizume, Shimosuwa, all of Japan

[73] Assignees: Nippon Hoso Kyokai, Tokyo; Kabushiki Kaisha Sankyo Seiki Seisakusho, Nagano, both of Japan

[21] Appl. No.: 752,629

[22] PCT Filed: Mar. 5, 1990

[86] PCT No.: PCT/JP90/00282
§ 371 Date: Aug. 27, 1991
§ 102(e) Date: Aug. 27, 1991

[87] PCT Pub. No.: WO90/10929
PCT Pub. Date: Sep. 20, 1990

[30] Foreign Application Priority Data

Mar. 6, 1989 [JP] Japan .................................. 1-52104

[51] Int. Cl.$^5$ .......................... G11B 5/588; G11B 5/53
[52] U.S. Cl. ................................... 360/107; 360/77.16; 360/84; 360/109; 360/130.23; 360/130.24
[58] Field of Search ............... 360/107, 122, 109, 751, 360/84, 130.23, 130.22, 130.24, 77.16, 77

[56] References Cited

U.S. PATENT DOCUMENTS 4,695,907 9/1987 Inaji et al. ........................ 360/107

Primary Examiner—Paul M. Dzierzynski
Assistant Examiner—Kim-Kwok Chu
Attorney, Agent, or Firm—Notaro & Michalos

[57] ABSTRACT

The present invention relates a helical scan-type magnetic recording and reproducing for use in VTR or DAT. This apparatus includes a head scanning mechanism which helically scans the tape (3) that runs in parallel with a reference plane using a head (4) rotatable along a slit (5) formed aslantly relative to the drum shaft (6) between the upper and lower fixed drums (2) and (1) arranged perpendicularly with respect to the reference plane. This mechanism consists of a rotary member (30) disposed concentrically with the upper and lower fixed drums (2) and (1), a linear guide (10) or (31) provided for the rotary member (30) to slide in a direction in parallel with the center of rotation of the rotary member near the head, a head (4) provided for the linear guide (10) or (31), and a cam mechanism (16) or (32) which gives axial displacement to the head (4) in the same direction as the slit (5) relative to the stationary cylindrical members (1), (2), (40). The head (4) is rotated by the rotary member (3) and is, at the same time, linearly reciprocated in the width wise direction of the tape smoothly and stably.

10 Claims, 6 Drawing Sheets

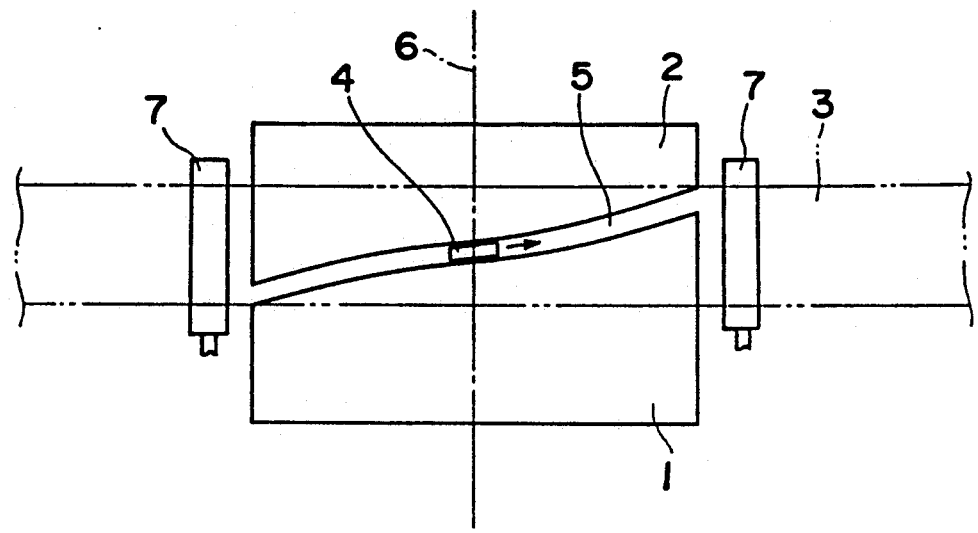
Fig. 1
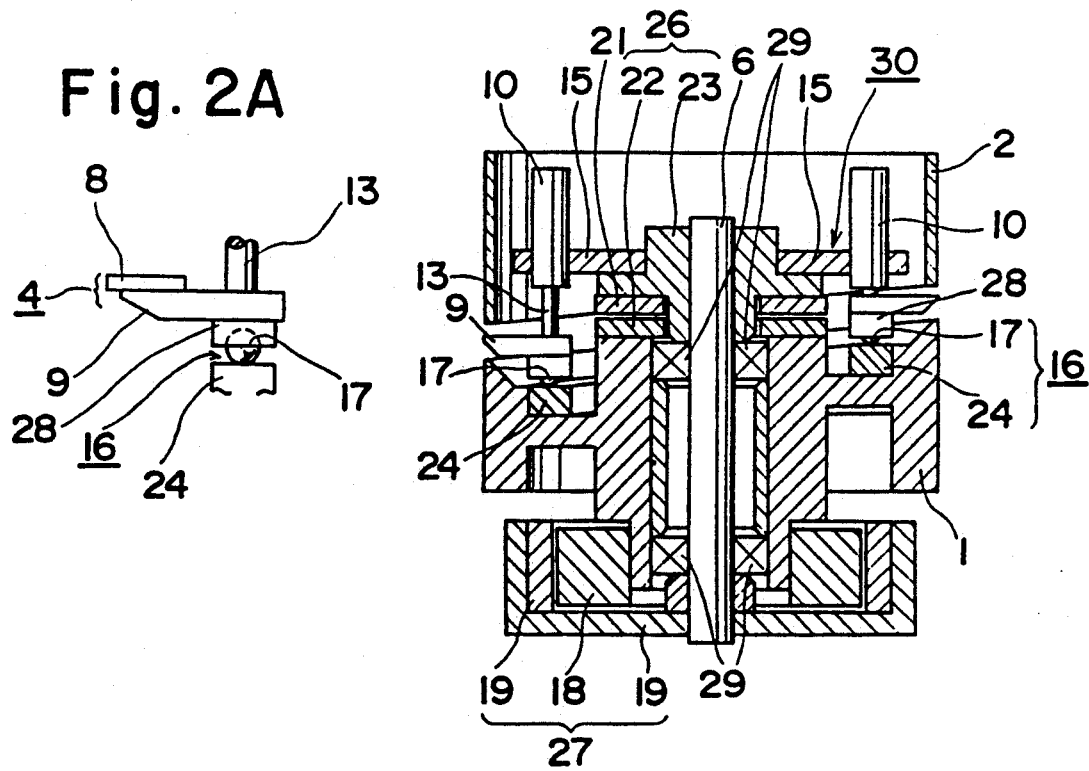
Fig. 2
Fig. 2A

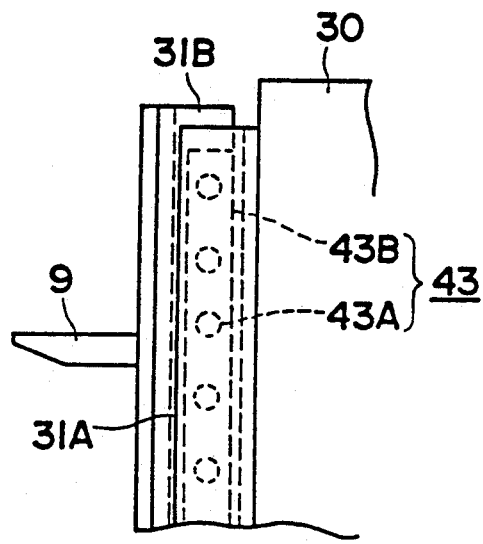
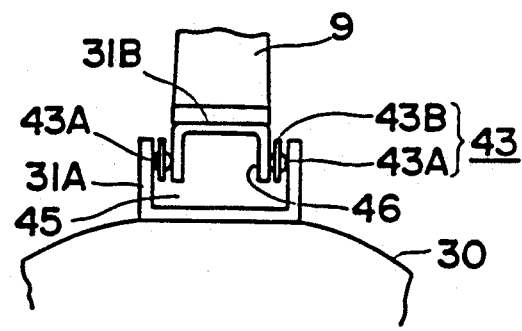

HELICAL SCAN TYPE ROTARY HEAD APPARATUS

TECHNICAL FIELD

The present invention relates to a helical scan-type magnetic recording and reproducing apparatus for use in, for example, VTRs (Video Tape Recorders) and DATs (Digital Audio Tape Recorders). More specifically, the present invention is concerned with a helical scan-type recording and reproducing apparatus which performs helical scan of a tape by helical running of magnetic heads, without requiring twisting of magnetic tape.

BACKGROUND ART

In known helical scan-type magnetic recording and reproducing apparatus for use in VTRs and DATs, some of guide posts and a drum are inclined with respect to a reference plane and the tape is wound on the drum at an inclination so as to run three-dimensionally, whereby the tape is helically scanned for recording and reproduction. The vertical position of the tape is forcibly limited by flanges on the guide posts and leads of the drum.

Thus, the tape is twisted on the inclined guide posts and drum forcibly by the flanges on the guide posts and the leads of the drum so as to run along a three-dimensional path. This arrangement, however, causes a tension to be developed nonuniformly upon the tape in the breadthwise direction of the tape, thus raising the possibility that the forcible guidance by the posts and drum lead will create a non-linear friction at the edges of the tape, particularly when the tape has been wound on the tape supply reel with a large fluctuation. As a consequence, problems are caused such as generation of jitter and damaging of tape edges. This problem is serious particularly when the tape has a small thickness. In the worst case, the tape cannot run at all. This type of arrangement is also disadvantageous in that it poses a limit on design for thin profile of the whole assembly.

To obviate this problem, a rotary head device for VTRs has been proposed (Japanese Patent Laid-Open Pub. No. 57-40733), in which, as shown in FIGS. 9A and 9B, a slit 104 which extends obliquely to the rotation shaft 103 is formed between an upper drum 101 and a lower drum 102 and, heads 105 are movable along the slit 104. In this rotary head device, a pair of head mounting members 106 with the heads 105 attached to opposite ends thereof are attracted to each other by a magnetic attracting force produced by magnets 111A, 111B, 112A, 112B, so as to clamp, through intermediary of balls 107, a rotary shaft 103 which is on the axis of rotation of the heads 105, so that the head mounting members 106 are reciprocally movable in the axial direction and rotatable together with the rotary shaft 103 in engagement therewith. The balls 107 are received in vertical V-shaped grooves which are formed in the head mounting members 106 and the rotary shaft 103, such that the balls are clamped between the head mounting members 106 and rotary shaft 103 under the magnetic force of the magnets 111A, 111B, 112A and 112B. Rotation of the rotary shaft 103 causes the head mounting members 106 to be moved by the guidance of the upper and lower drums 101, 102, while being rotated within the slit 104, for axial reciprocal movements, which forms helical tracks on the tape which runs on the peripheral surfaces of drums 101, 102 in the direction perpendicular to the axis of these drums.

In such arrangement, a mechanical play (wobbling) is likely to be formed, in view of the balls 107, which allows vertical movement of the heads 105, being held between the rotary shaft 103 and head mounting members 106 which are attracted to each other through the magnetic attracting force of magnets 111A, 111B, 112A and 112B. This play tends to be amplified so as to appear with greater magnitude on the portions of the heads 105 adjacent the outer peripheral surface of the drum. In addition, the mechanical connection between the head mounting members 108 and rotary shaft 103 is quite unstable because they are supported through the balls 107 alone as to the rotational direction. Furthermore, adjustment of clearance is extremely difficult to conduct due to the necessity for the upper and lower guide surfaces 108, 109 for the vertical movement of the head mounting members 106. It is also to be pointed out that the provision of the roller 110 at a contact point, where the head mounting members 106 is contacted with the guide surfaces 108, 109, results in a discordance between the rotational direction of the head mounting members 106 and that of the roller 110, wherein the latter rotational direction is tangential to the former one.

DISCLOSURE OF THE INVENTION

Accordingly, an object of the present invention is to provide a magnetic recording and reproducing apparatus capable of performing, in a stable manner, a helical scan recording which allows a stable two-dimensional running of the tape to cope with the current trend for thinning of tapes and which is considered to be most suitable for recording at a high recording density.

To this end, according to the present invention, there is provided a magnetic recording and reproducing apparatus including an upper stationary drum and a lower stationary drum, which are arranged coaxially with each other and perpendicularly to a reference plane, a slit formed between said upper and lower drums, said slit extending obliquely relative to axis of said drums, and a head disposed in said slit, wherein said head is rotated about said drum axis so as to form a helical track pattern on a tape which runs on said drums in parallel with said reference plane, characterized in that said apparatus comprises a rotary member rotatable about said drum axis which forms a center of rotation for the rotary member, a linear guide fixed to said rotary member and disposed adjacent a peripheral surface side of said drums, said linear guide being slidable in a direction parallel with said rotation center of said rotary member, a head fixed to said linear guide and projecting from outer peripheral surfaces of said drums through said slit, and a cam mechanism provided between said linear guide and a stationary cylindrical member concentric with said rotary member, said cam mechanism being adapted to impart to said head an axial displacement conforming with a configuration of said slit, whereby rotation of said rotary member causes said head to be rotated about said axis and reciprocately moved vertically in a breadthwise direction of said tape through action of said cam mechanism.

Accordingly, rotation of the rotary member causes rotative motion of the concentric linear guide about an axis perpendicular to the reference plane, thus subjecting the head to rotation and synchronous displacement in the breadthwise direction of the tape through the cam mechanism, in the vicinity of the head adjacent the drum peripheral surfaces, whereby the head is made to run helically with respect to the tape which runs in parallel with the reference plane.

In the magnetic recording and reproducing apparatus of the present invention, the rotary member concentric with the drums and the head are connected together in the region near the head through the linear guide which is slidable only in the direction of breadth of the tape. As a consequence, mechanical errors such as play (wobbling) in the connection are remarkably diminished and are never amplified when such errors are transmitted to the head, whereby higher degrees of scanning precision and stability of mechanism are obtained.

In one aspect of the present invention, the linear guide supporting the head is so constructed as to contact the cam surface through a ball contactor, for smooth sliding motion, eliminating a discordance in the rotation direction, so as to insure a high stability of operation.

BRIEF DESCRIPTION OF THE DRAWINGS

FIG. 1 is a schematic illustration of a scanning system in accordance with the present invention;

FIG. 2 is a vertical sectional view of an embodiment of the invention employing a single cam, taken along the axis thereof;

FIG. 2A is an enlarged view of a cam mechanism incorporated in the embodiment shown in FIG. 2;

FIG. 7B is a side elevational view of a linear guide used in the embodiment shown in FIG. 7A, depicting in detail the construction of the linear guide;

FIG. 7C is a plan view of the same linear guide;

THE BEST MODE FOR CARRYING OUT THE INVENTION

Figure 3:
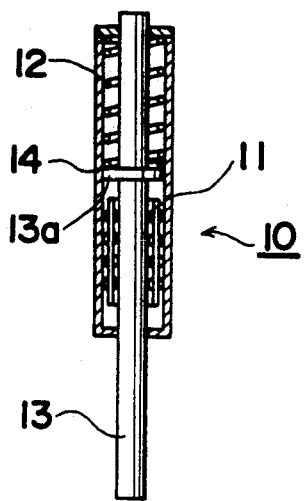
FIG. 3 is a vertical sectional view of a linear guide taken along the axis thereof.

The invention will be described in more detail with reference to the accompanying drawings which show embodiments of the present invention.

As shown in FIG. 1, the magnetic recording and reproducing a helical scan type rotary head apparatus of the present invention has upper and lower drums 2 and 1 which are disposed concentrically with an axis, e.g., a rotary shaft 6, which is perpendicular to a reference plane, e.g., a criterion plane for mounting the rotary head in the apparatus. The upper and lower drums 1 and 2 define therebetween a slit 5 along which heads 4 move while rotating. The heads 4 are rotatable together with the rotary shaft 6, such that they are mechanically moved up and down in the breadthwise direction by a cam mechanism 16, simultaneously with their rotation, to thereby form, in the same manner as that in the known apparatus, helical track patterns upon a tape 3 which is wound around the drums 1, 2 and runs in parallel with the reference surface. In this regard, the tape 3 may be wound upon the drums 1, 2 by moving the tape guide 7 for access to the drums as in the hitherto manner.

As will be seen from FIG. 2, the head 4 is attached to a rotary member 30 which is rotatable concentrically with the center of the drums 1, 2, through linear guides 10 slidable in parallel with the rotary shaft 6. In the illustrated embodiment, the rotary member 30 is composed of the rotary shaft 6 on the center of the drums and a disk-shaped supporting member 15 fixed to the rotary shaft 6. The rotary member 30 is supported by the linear guides 10 for sliding movement in the axial direction of drums, or in the breadthwise direction of tape, the linear guides 10 being disposed in the peripheral surface of supporting member 15. In general, the head 4 is composed of a head chip 8 and a head base 9 in support of the head chip 8, wherein rods 13 of the linear guides 10 are at their ends fixed to the head base 9. As shown in FIG. 3, the linear guide 10 may be composed of a linear bearing 11, a bias spring 12, a rod 13 and an outer cylinder 14, for example, with such arrangement that, when no load is applied to the linear guide 10, the rod 13 tends to be projected outwardly from the outer cylinder 14 by the force of a bias spring 12 which acts on a collar 13a of the rod 13. However, the rod 13, when applied an upward force, is moved upwardly with a smoothness against the force of bias spring 12. The outer cylinder 14 of linear guide 10 is mounted fast to the supporting member 15 such that the rod 13 moves into and out of the outer cylinder 14 in the direction perpendicular to the supporting member 15, i.e., in the direction parallel to the rotary shaft 6. The supporting member 15 is fixed to the rotary shaft 6 through a disk-shaped attachment 23. In this context, it is noted that a known rotary transducer 26 is constituted by providing a rotatable element 21 at a rotary side of the attachment 23 while providing a stationary element 22 at a fixed side of the lower drum 1 for exchanging reproduced signals or recording signals between those two elements.

A ring-shaped swash plate cam 24 forming a cam mechanism 16, is provided in the vicinity of the end surface of the lower drum 1 defining the slit 5. Although the cam 24 is constructed as a part separate from the lower drum 1 in this embodiment, this is not exclusive and the cam 24 may be formed as an integral part of the lower drum 1. The cam 24 has such a cam contour along which there may be produced a predetermined axial displacement within a given period between a first moment at which the tape starts to be wound around the drums and a last moment at which the tape leaves the drums, whereby a track pattern similar to the known helical track pattern can be formed on the tape 3 running in parallel with the reference plane. FIG. 1 shows an example of the cam phase diagram illustrative of the rotational phases of the cam adopted when the embodiment is applied to a VHS type device. In ordinary VHS type device, the tape is wound through an angle not smaller than 180° to allow a switching operation between the heads for signal transmission. In this embodiment, therefore, the cam contour is so determined that the required displacement is effected within the period between −5° at which the winding of tape is commenced and 185° at which the tape leaves the drum and is reset to the starting position within the period of 170° between 185° and 355° in terms of rotation angle of the cam.

The cam 24 forms a cam mechanism 16 in cooperation with a follower which is preferably of the type having a ball contactor 17. The ball contactor 17 is rotatably held by a supporting member 28 comprising a spherical bearing and is fixed, for example, to the end of the rod 13 of the linear guide 10 together with the head base 9. According to this arrangement, the head 4 contacts with the cam 24 through the ball contactor 17, whereupon rotation of the supporting member 15 causes following motions of the ball contactor 17 along the contour of cam 24 and in response to such motions, the head 4 is displaced upwardly and downwardly.

A stator coil 18, which is secured to the lower drum 1, forms a drive motor 27 in cooperation with a rotor magnet 20 on the inner peripheral surface of the rotor casing 19 fixed to the rotary shaft 6.

In operation, rotation of the supporting member 15 fixed to the rotary shaft 6 by actuation of the drive motor 27 causes the linear guide 10 to revolve about the rotary shaft 6, such that the movements of ball contactor 17 at the linear guide's end, following the cam 24, add to the rotation of heads 4 an axial reciprocative motion, thus effecting a helical scan on the tape which is running in parallel with the reference plane.

Figure 5:
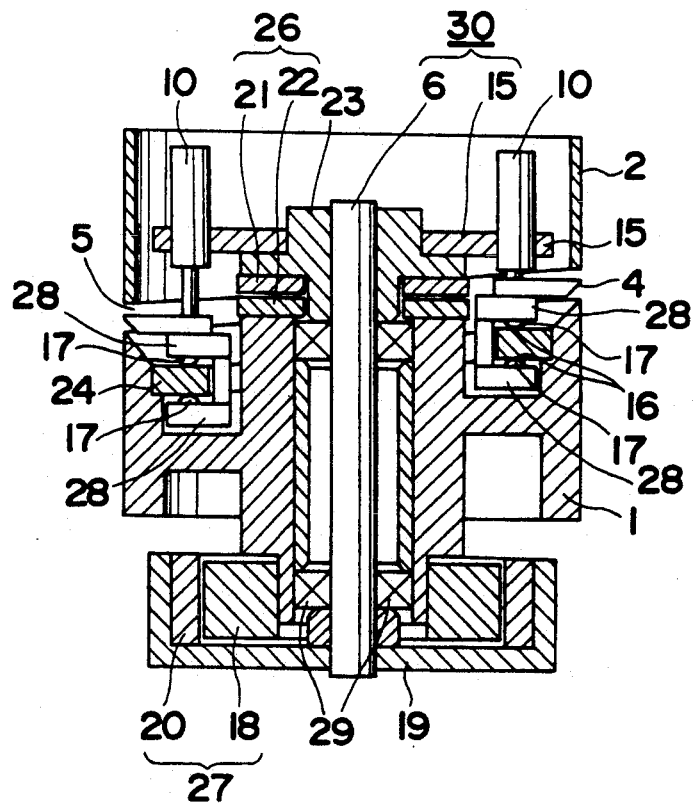
FIG. 5 is a vertical sectional view of another embodiment which employs a positive motion cam.

FIG. 5 shows another embodiment wherein the cam mechanism 16 constitutes a so-called positive motion cam including a cam 24 having a cam surface on both upper and lower surfaces thereof and ball contactors 17 so disposed to contact both of those cam surfaces vertically, with the ball contacts 17 being thus held in contact with the cam 24, which requires no spring force. Specifically, the ball contactors 17 are mounted on opposing inner surfaces of both legs of a substantially U-shaped supporting member 28 which is turned sideways, so that the contactors clamp the cam 24 at its upper and lower sides to support same therein. Hence, the upper and lower ball contactors 17 cooperate to insure the foregoing axial displacement, without requiring any bias spring 12. This particular embodiment, therefore, eliminates any loss of driving torque caused by the forcible contact between the ball contactor 17 and cam 24 under the influence of bias spring 12.

Figure 7A:
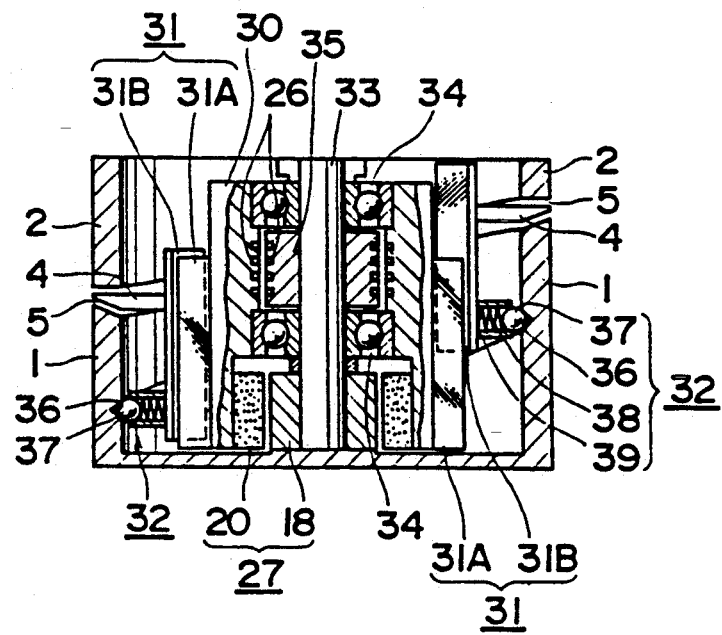
FIG. 7A is a vertical sectional view of still another embodiment of the invention.

FIG. 7A shows still another embodiment wherein a rotary member 30 rotatable about the axis of the upper and lower drums 1, 2 is disposed on the inner side of these drums, the rotary member 30 including linear guides 31 fixed thereto, and wherein, provided between the lower drum 1 and linear guides 31, is a cam mechanism 32 for effecting the required axial displacement of heads 4. The rotary member 30 is rotatably mounted via radial bearings 34, 34, on a shaft 33 fixed to the center of the lower drum 1, the shaft 33 being perpendicular to the reference plane. A rotary transducer 26 and a drive motor 27 are formed between the rotary member 30 and shaft 33. For instance, the rotary transducer 26 is composed of transducer coils one of which is embedded in the peripheral surface of a ring 35 fixed to the shaft 33 while the other is embedded in the inner peripheral surface of the rotary member 30 opposing to the outer peripheral surface of the ring 35. The drive motor 27 may, for example, comprise a stator coil 18 provided on the shaft 33 and a rotor magnet 20 provided on the rotary member 30.

Figure 4:
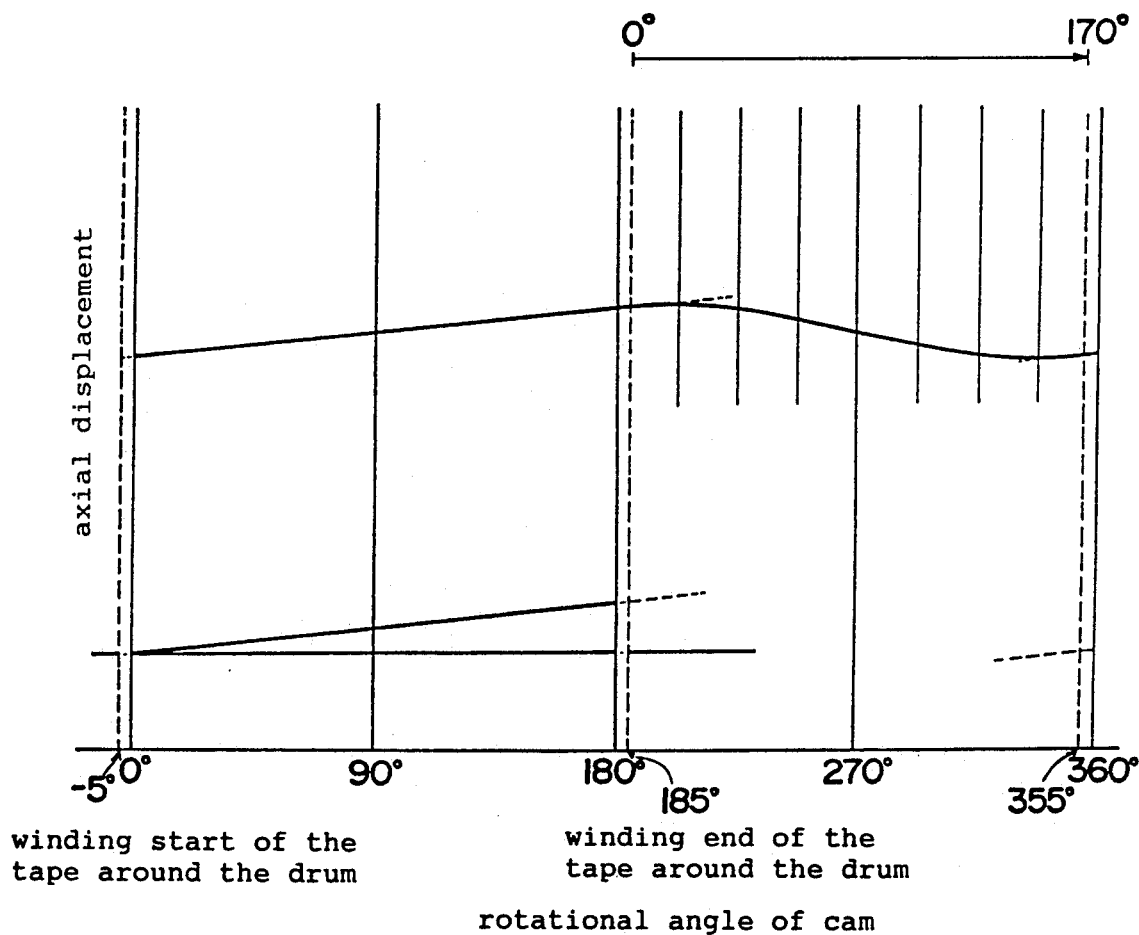
FIG. 4 is a cam phase diagram obtained by the invention as applied to a VHS type device.

The linear guides 31 are secured to the rotary member 30, such that the guides 31 are slidingly movable in the direction of generating lines parallel to the axis of rotation of the rotary member 30. As will be seen from FIGS. 7B and 7C, the linear guide 31 includes, for example, a stationary holder 31A having a guide groove 45 extending in the direction of generating line of the rotary member 30, a slider 31B having a projection 46 slidably received in the groove 45 of the holder 31A and thus slidable in the direction of generating line of the rotary member 30, and a linear ball bearing 43 acting between the holder 31A and the slider 31B. Thus, no play is allowed to exist in the rotational direction. A head base 9 of the head 4 is fixed to the slider 31B of the linear guide 31, such as to project through the slit 5 towards the outer peripheral surfaces of the drums 1, 2. Each linear guide 31 is provided with a ball contactor 37 which projects therefrom in the radial direction of the rotary member 30 and which serves as the follower of the cam mechanism 32. For instance, the ball contactor 37 is held by a holder 39 which accommodates a spring 38 for urging the ball contactor 37 into a cam groove 36. Thus, in this embodiment, the cam groove 36 is presented by a V-shaped groove which is provided in a peripheral surface of a stationary cylinder which is in this case the inner peripheral surface of the lower drum 1. The cam 36 causes an axial displacement of the slider 31B of the linear guide 31 as shown in the cam phase diagram of FIG. 4.

In operation, actuation of the dive motor 27 causes rotation of the rotary member 30 supported on the shaft 33, which in turn causes the linear guides 31 integral with the rotary member 30 to be rotated about the axis of the shaft 33, i.e., about the axis of the drums. At the same time, the sliders 31B of linear guides 31, by the reason of their engagement with the cam groove 36 via the ball contactors 37, are subject to vertical movements pursuant to the groove 36, thereby effecting the given axial displacement of the head 4. In this way, the heads 4 perform a helical scan along the slit.

Figure 8:
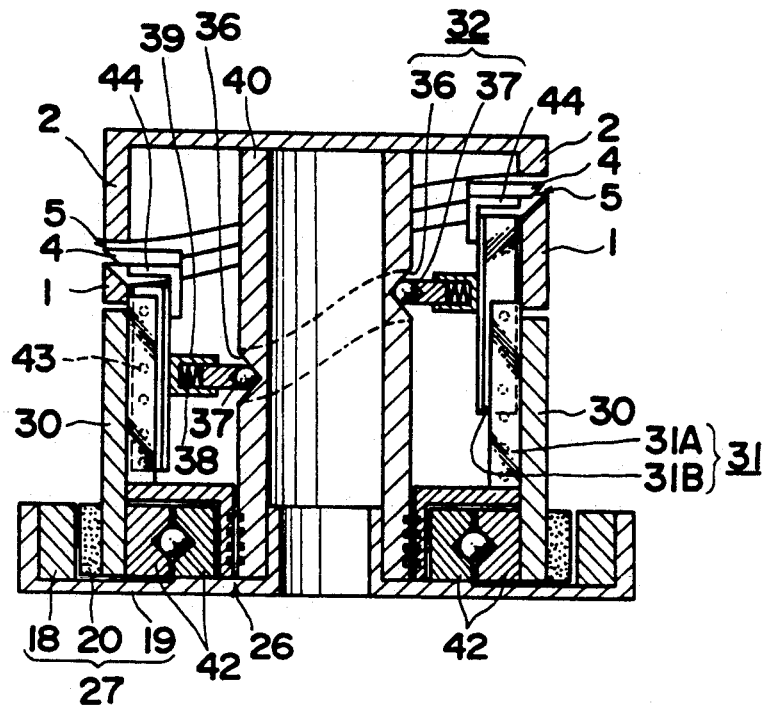
FIG. 8 is a vertical sectional view of a further embodiment of the invention taken along the axis thereof.
Figure 9A:
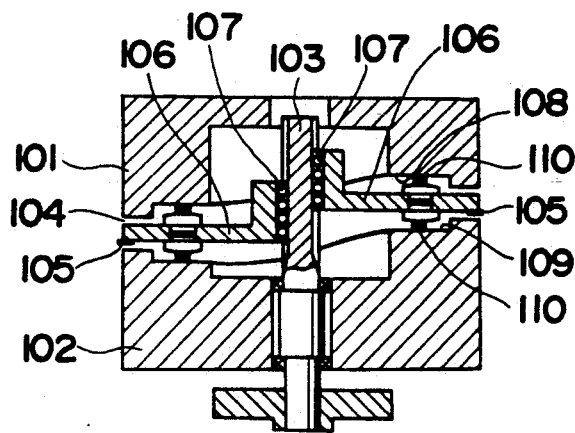
FIG. 9A is a vertical sectional view of a conventional rotary head device taken along the axis thereof.
Figure 9B:
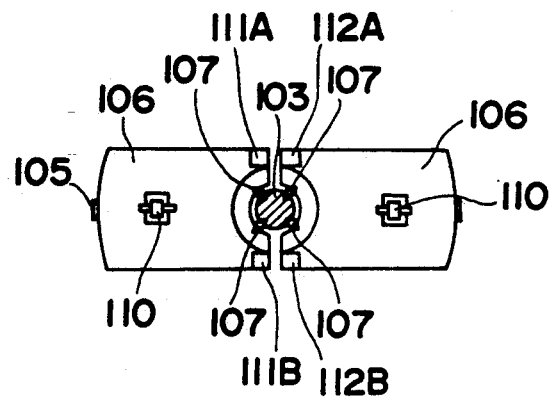
FIG. 9B is a plan view of a head supporting structure in that conventional rotary head device.

FIG. 8 shows a further embodiment which is a modification of the embodiment shown in FIG. 7A. According thereto, arranged within the drums 1, 2, is a stationary cylinder 40 having a cam groove 36 formed therein, with a rotary member 30, which carries the linear guides 31, surrounding the stationary cylinder 40, and there are provided cam mechanisms to act between the stationary cylinder 40 and linear guides 31. This arrangement simplifies the construction and facilitate the production. Similar to the embodiment shown in FIG. 7A, the linear guide 31 includes a holder 31A and a slider 31B which are assembled together with the intermediary of a linear ball bearing 43. The head 4 is secured to the slider 31B through an L-shaped bracket 44. The rotary member 30 is rotatably held by a disk-shaped slider 19 through a ball bearing 41. The rotary member 30 is a cylinder having the same diameter as that of the lower drum 1 and is disposed coaxially with the upper and lower drums 2 and 1. The upper drum 2 is fixed to the upper end of the stationary cylinder 40 and the lower drum 1 is fixed to the upper drum 2. Fixation of the lower drum 1 to the upper drum 2 may be for example such that their respective peripheral surface sides are coupled together, at the surface areas free from contact with the tape 3, by means of connecting members (not shown). In this embodiment, the rotary transducer is composed of two members one of which is provided on the stationary cylinder 40 while the other is provided on a cylindrical member 42 which projects inwardly from the rotary member 30. The drive motor 27 is constructed by a rotor magnet 20 provided on the rotary member 30 and a stator coil 18 provided on the stator disk 19.

Figure 6A:
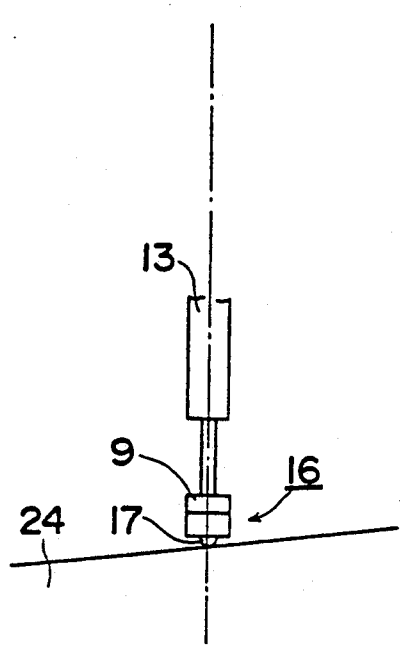
FIG. 6A is an illustration of an example of ball contactor.
Figure 6B:
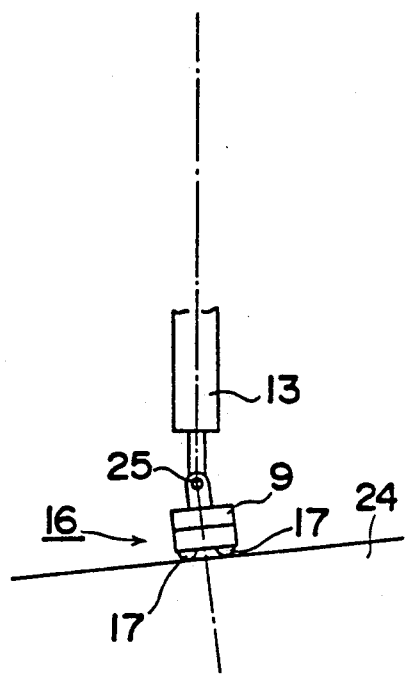
FIG. 6B is an illustration of another example of ball contactor.

Although preferred embodiments of the present invention have been described, it is to be understood that these embodiments are not exclusive and various changes and modifications may be imparted thereto without departing from the spirit of the present invention. For instance, the linear guide 10 may employ a slide bearing or other suitable bearing in place of the linear ball bearing used in the described embodiment. It is also possible to arrange such that, as shown in FIG. 6B, a pair of ball contactors 17 are used in combination and the head base 9 is pivotable about a fulcrum 25 provided on the rod 10. With this arrangement, the head base 9 and slit 5 are kept in parallel relationship with each other at any point so that the width of the slit 5 can be reduced. Furthermore, when a high-precision tracking pattern is required to cope with the demand for a higher recording density, the invention may be combined with dynamic tracking head which has a facility to control the head position in accordance with the head output. The supporting member 15, which is a disk-shaped member in the illustrated embodiments, may have other forms such as tubular and rod-like forms, e.g., a form of a video bar.

We claim:

1. A helical scan type rotary head apparatus including an upper stationary drum and a lower stationary drum, which are arranged coaxially with each other on a drum axis and perpendicularly to a reference plane, a slit formed on a circumference of and between said upper and lower drums, said slit extending obliquely relative to said drum axis of said drums, and a head disposed in said slit, wherein said head is rotated about said drum axis so as to form a helical track pattern on a tape which runs on said drums in parallel with said reference plane, said apparatus comprising a rotary member rotatable about said drum axis which forms a center of rotation for the rotary member, a linear guide fixed to said rotary member and disposed adjacent a peripheral surface side of said drums, said linear guide being slidable in a direction parallel with said rotation center of said rotary member, a head fixed to said linear guide and projecting from outer peripheral surfaces of said drums through said slit, and a cam mechanism provided between said linear guide and a stationary cylindrical member concentric with said rotary member, said cam mechanism being adapted to impart to said head an axial displacement conforming with a configuration of said slit, whereby rotation of said rotary member causes said head to be rotated about said axis and reciprocately moved vertically in a breadthwise direction of said tape through action of said cam mechanism.

2. An apparatus according to claim 1, wherein said rotary member comprises a rotary shaft on the center of said upper and lower drums and a plate-like supporting member which is fixed to said rotary shaft in a manner to extend generally orthogonal thereto, and wherein at a portion of said supporting member adjacent the peripheral surfaces of said drums, there is provided a linear guide which is expandable and contractable in a direction parallel with said rotary shaft, said linear guide including a sliding member having, provided at its end, a follower which is associated with a cam mechanism arranged between said head and one of said lower and upper drums.

3. An apparatus according to claim 1, wherein said rotary member is a cylindrical member, and wherein said linear guide is mounted at peripheral surfaces of such cylindrical member in a parallel relation with a generating line of the same cylindrical member.

4. An apparatus according to claim 1, wherein said cam mechanism comprises a cam formed on a circumferential surface of said stationary cylindrical member, and a cam follower connected to said linear guide.

5. An apparatus according to claim 1, wherein said cam mechanism includes a swash plate cam provided on one of said lower and upper drums, and a follower provided on said linear guide, said follower being adapted to roll on said cam.

6. An apparatus accordimg to claim 5, wherein said follower in a ball contactor.

7. An apparatus according to claim 1, wherein said cam mechanism comprises a positive motion cam which includes a swash plate cam and a follower adapted to clamp both sides of said cam in a direction for said follower to move.

8. An apparatus according to claim 7, wherein said follower includes a pair of ball contactors rockably secured to said linear guide.

9. An apparatus according to claim 1, wherein said cam mechanism includes a cam groove formed in a peripheral surface of said stationary cylindrical member and a ball contactor which rolls along said cam groove.

10. An apparatus according to claim 9, wherein said cam groove is a V-shaped groove.

* * * * *